(12) United States Patent
Agarwal et al.

(10) Patent No.: US 7,299,404 B2
(45) Date of Patent: Nov. 20, 2007

(54) DYNAMIC MAINTENANCE OF WEB INDICES USING LANDMARKS

(75) Inventors: Ramesh C. Agarwal, Saratoga, CA (US); Lipyeow Lim, Durham, NC (US); Sriram K. Padmanabhan, Briarcliff Manor, NY (US); Min Wang, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 10/430,049

(22) Filed: May 6, 2003

(65) Prior Publication Data
US 2004/0225963 A1 Nov. 11, 2004

(51) Int. Cl.
*G06F 15/00* (2006.01)
(52) U.S. Cl. ................ 715/500; 715/539; 715/530
(58) Field of Classification Search ........ 715/500, 715/539, 530
See application file for complete search history.

(56) References Cited

U.S. PATENT DOCUMENTS

| | | | | |
|---|---|---|---|---|
| 5,812,999 | A * | 9/1998 | Tateno | 707/3 |
| 6,055,544 | A * | 4/2000 | DeRose et al. | 707/104.1 |
| 6,185,591 | B1 * | 2/2001 | Baker et al. | 715/531 |

OTHER PUBLICATIONS

Bertino et al., "Query Processing in a Multimedia Document System," ACM Transactions on Office Informtion Systems, vol. 6, No. 1, Jan. 1988, p. 1-41.*
Yoshikawa et al., "Xrel: A Path-Based Approach to Storage and Retrieval of XML Documents Using Relational Databases," ACM Transactions on Internet Technology, vol. 1, No. 1, Aug. 2001, p. 110-141.*

* cited by examiner

*Primary Examiner*—William Bashore
*Assistant Examiner*—Amelia Rutledge
(74) *Attorney, Agent, or Firm*—Ido Tuchman; Anne V. Dougherty

(57) ABSTRACT

A repository index records the position of document entries relative to landmark entries within the document. Landmark entries are selecting using a landmarking policy and their position relative to the document are stored in a landmark directory. During index updates, an edit transcript is generated describing the difference between old and new document versions, and both the document repository index and the landmark directory are updated as needed. Thus, the number of update operations preformed as compared with conventional indexing techniques may be substantially reduced when small, localized changes are made to the document. This is due to fact that the positions of document entries are recorded relative to the landmark entries rather than the document itself. By doing so, the document index becomes more shift-invariant, requiring fewer update operations when entries are added or inserted in localized areas of the document.

12 Claims, 5 Drawing Sheets

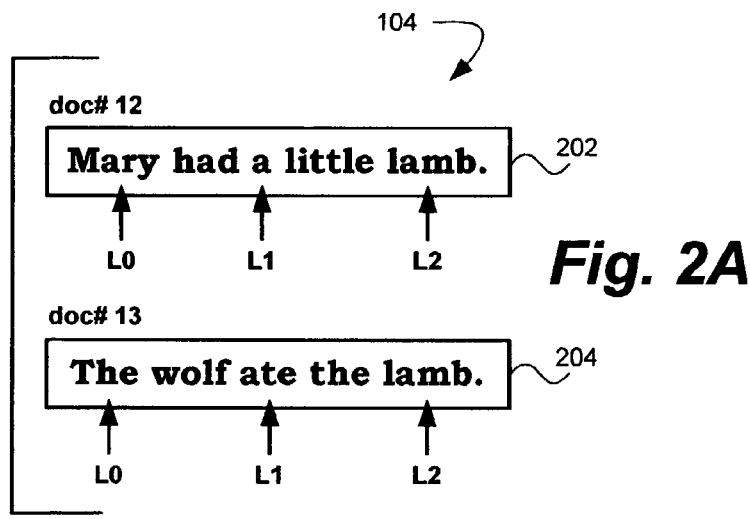
*Fig. 2A*
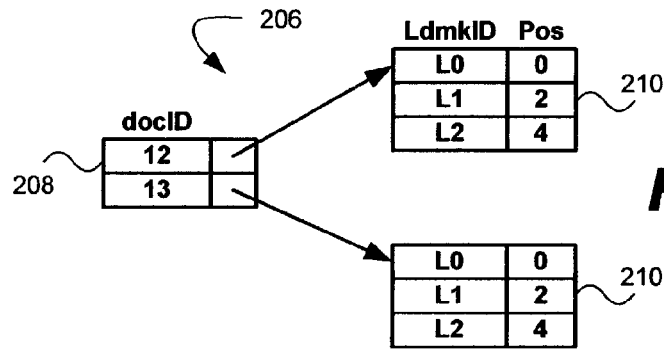
*Fig. 2B*
*Fig. 2C*
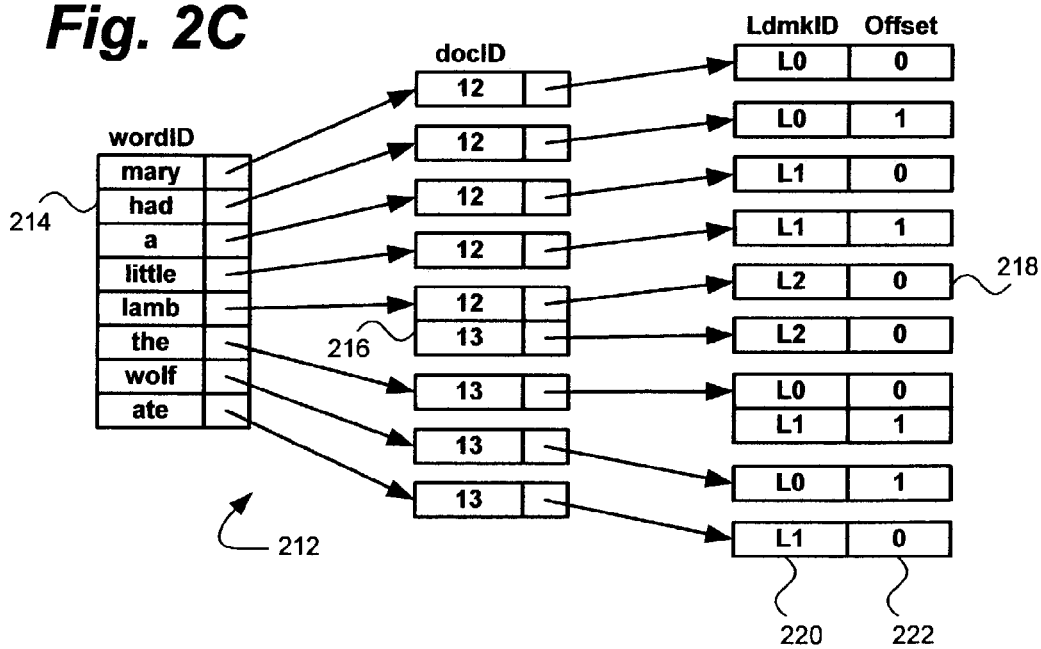

DYNAMIC MAINTENANCE OF WEB INDICES USING LANDMARKS

FIELD OF THE INVENTION

The present invention relates generally to document indexing, and, more specifically, to document indexing using landmark entries and edit transcripts to improve updating performance.

BACKGROUND

As the amount of information stored in computer memory continues to grow, the ability to efficiently search through and find relevant documents becomes more and more important. The World Wide Web, for example, provides access to millions of documents covering just about every topic imaginable. Thus, when searching the Web for information, a challenge in computer science is to efficiently find those documents that the searcher is interested in.

Many of the most popular search techniques utilize indexing to keep track of documents on a network (such as the World Wide Web). Indexing is the process by which search engines extract information from a document repository so that its content can later be searched. In effect, a document repository index is a local snapshot in time of the repository's content. The index can then be quickly searched to find the most relevant documents in the repository for a given search query. Since the information in the document repository may be constantly changing, it is important to frequently update the index so that the snapshot is as current and accurate as possible.

There are many indexing techniques known in the art. An inverted index is the indexing technique of choice for most web documents. Search engines use an inverted index for HyperText Markup Language (HTML) documents, and Database Management Systems (DBMS) use it to support containment queries in eXtensible Markup Language (XML) documents. An inverted index is a collection of inverted lists, where each list is associated with a particular word. An inverted list for a given word is a collection of document IDs of those documents that contain the word. If the position of a word occurrence in a document is needed, each document ID entry in the inverted list also contains a list of location IDs. Positional information of words relative to the document is usually stored because it is needed for proximity queries and query result ranking. Omitting positional information in the inverted index is therefore a serious limitation. Positional information is usually stored in the form of location IDs. The location ID of a word is the position in the document where the word occurs. An entry in an inverted file is also called a posting, and it encodes the information in a tuple (word_id, doc_id, loc_id).

Since web documents change frequently, keeping inverted indexes up-to-date is crucial in making the most recently indexed documents searchable. A crawler (also referred to as a spider) is a program that collects web documents to be indexed. It has been shown that an in-place, incremental crawler can improve the freshness of the inverted index. However, the index rebuild method commonly used to update the inverted index cannot take advantage of an incremental crawler because the updated documents crawled in between rebuilds have to wait until the next index rebuild before they are searchable.

One solution known in the art for keeping document repositories up-to-date is to rebuild the index more frequently. As the interval between rebuilds gets smaller, the magnitude of change between the two snapshots of the indexed collection also becomes smaller. A large portion of the inverted index will remain unchanged, and a large portion of the work done by the rebuild is redundant. A frequent rebuild solution, however, is inefficient because it rebuilds portions of the index that did not change.

Another approach known in the art is to store the updates in between rebuilds in a searchable update log. This is similar to a 'stop-press' technique used to store the postings of documents that need to be inserted into the indexed collection. Each entry in this update log will either be a delete posting or an insert posting operation. Query processing requires searching both the inverted index and the update log and merging the results of both. If positional information is stored in each posting, which is often the case, the size of the update log can become prohibitively large. Thus, the update log technique is generally unsatisfactory because it is too large and affects query response time.

SUMMARY OF THE INVENTION

The present invention addresses the above-mentioned limitations and other shortcomings of conventional document indexing techniques by providing an efficient technique for indexing document repositories based on landmark entries. While a small document change could result in updates to all the postings for that document in an index using existing indexing techniques, the present invention uses landmarks together with an edit transcript to significantly reduce the number of postings in the document index that need to be updated. Landmarks maintain positional information for each word while simultaneously allowing fast dynamic updating of the indexes.

Thus, an exemplary aspect of the present invention involves a method for indexing a document. The method includes a dividing operation and a recording operation. The dividing operation divides the document into a plurality of blocks, and each block is associated with a landmark entry. The recoding operation records the position of at least one document entry relative to the landmark entry of the block containing the document entry.

Another exemplary aspect of the invention is a computer readable data structure for indexing documents in a document repository. Each document includes a plurality of document entries, and the data structure includes a landmark directory and a repository index. The landmark directory is configured to store the location of landmarks in the documents. The repository index is configured to store the location of document entries relative to the landmarks.

A further exemplary aspect of the invention is a method for maintaining a document index for a document which is changed from an old document version to a new document version. The method includes a generating operation to generate an edit transcript. The edit transcript describes the difference between the old document version and the new document version. An updating operation updates a landmark directory such that the positions of landmark entries with respect to the new document version are maintained. Another updating operation updates a repository index such that the positions of document entries in the new document version with respect to the landmark entries are maintained.

Yet another exemplary aspect of the invention is a system for maintaining a document index for a document which is changed from an old document version to a new document version. The system includes a difference module configured to generate an edit transcript describing the difference between the old document version and the new document version. A landmark update module is configured to update a landmark directory such that the positions of landmark entries with respect to the new document version are maintained. An index update module is configured to update a repository index such that the positions of document entries in the new document version with respect to the landmark entries are maintained.

The foregoing and other features, utilities and advantages of the invention will be apparent from the following more particular description of various embodiments of the invention as illustrated in the accompanying drawings.

BRIEF DESCRIPTION OF THE DRAWINGS

FIG. 2A shows exemplary documents in a document repository.

FIG. 2B shows an exemplary landmark directory, as contemplated by the present invention.

FIG. 2C shows an exemplary repository index, as contemplated by the present invention.

DETAILED DESCRIPTION OF THE INVENTION

Figure 1:
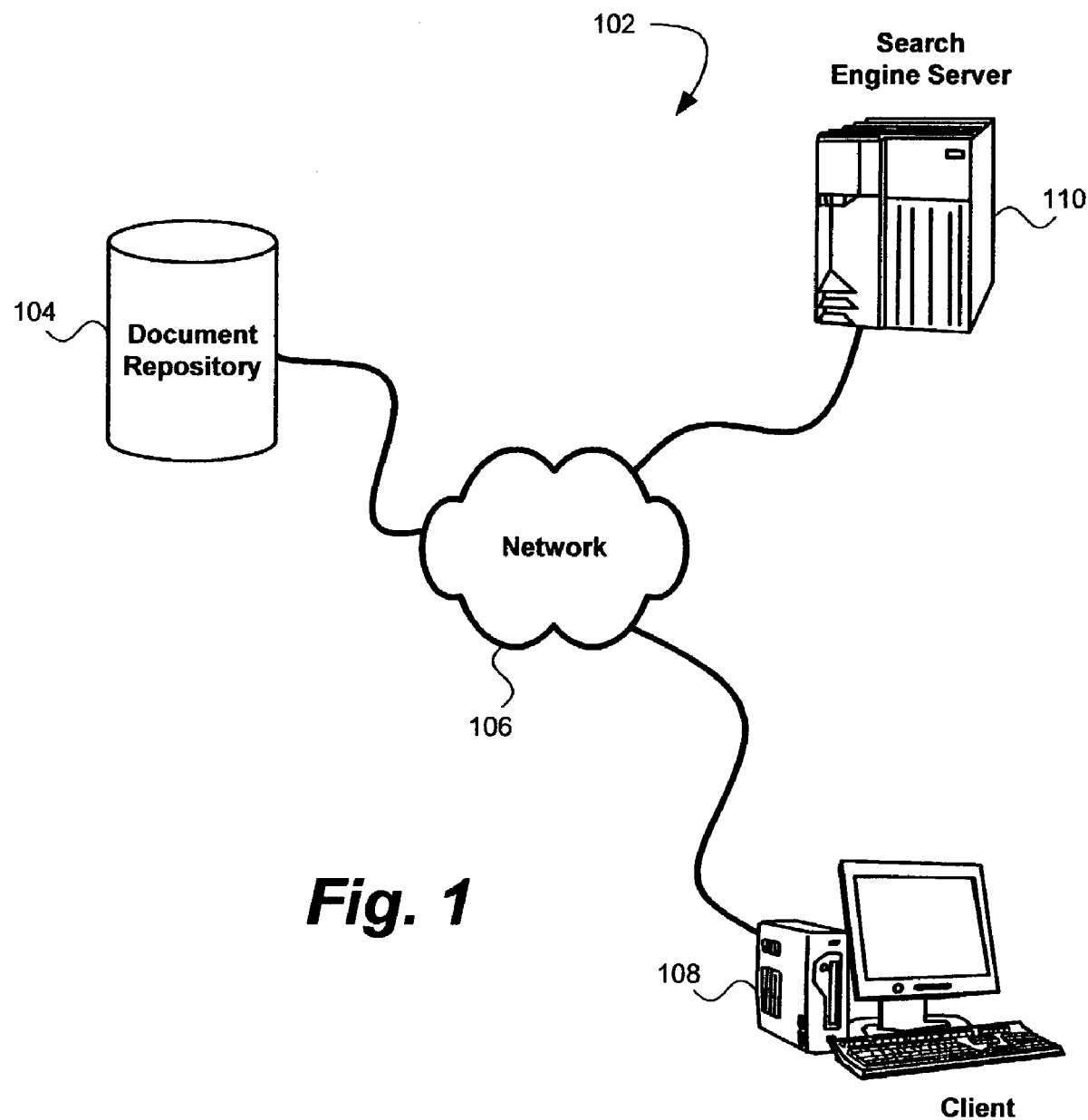
FIG. 1 shows an exemplary network environment embodying the present invention.

The following description details how the present invention is employed to efficiently index documents using landmark entries. Throughout the description of the invention reference is made to FIGS. 1-5. When referring to the figures, like structures and elements shown throughout are indicated with like reference numerals.

In FIG. 1, an exemplary computer environment 102 embodying the present invention is shown. It is initially noted that the computer environment 102 is presented for illustration purposes only, and is representative of countless configurations in which the invention may be implemented. Thus, the present invention should not be considered limited to the system configuration shown in the figure.

Generally, the computer environment 102 includes a document repository 104 coupled to a computer network 106. The document repository 104 represents a collection of computer readable information accessible through the computer network 106. The document repository 104 may contain documents in various formats, such as, but not limited to HTML pages, Portable Document Format (PDF) documents, and various other formats known to those skilled in the art. Documents in the document repository 104 may be stored at one location on the network 106, such as a Network-Attached Storage (NAS) server, or the documents may be distributed over various network locations. For example, the document repository 104 may represent the constantly changing documents available over the World Wide Web. Data analysis of Web documents shows that changes to most documents are small and that these changes are spatially localized within the document. The present invention provides an indexing scheme that exploits these properties.

The computer network 106 may be any network known in the art for effectuating communications between the various devices in the computer environment 102. Thus, the network 106 can be a local area network (LAN), a wide area network (WAN), or a combination thereof. It is contemplated that the network 106 may be configured as a public network, such as the Internet, and/or a private network, and may include various topologies and protocols know to those skilled in the art.

A client 108 is also coupled to the computer network 106 and represents an entity searching for relevant documents in the document repository 104. Typically, the client 108 conducts a search using a search engine server 110. As discussed below, the search engine server 110 is configured to index documents in the document repository 104 according to the present invention. In one embodiment of the invention, the search engine server 110 utilizes a crawler (not shown) to automatically find documents in the document repository 104 and update the search engine's records. The client 108 submits a search query to the search engine server 110 and the search engine server 110 returns search results back to the client 108.

In FIG. 2A, two exemplary documents 202, 204 in the document repository 104 are shown. The first document 202 is identified as doc# 12, and contains the text, "Mary had a little lamb." The second document 204 is identified as doc# 13, and contains the text, "The wolf ate the lamb." Each document contains a plurality of document entries. In the present example, the document entries are individual words. In other configurations of the invention, document entries may include tags, strings, letters, numbers, audio blocks, video blocks, and other types of information entries.

The documents 202, 204 are indexed according to the present invention by choosing landmark entries within each document. Selecting landmark entries in a document is based on a landmarking policy, and is described in more detail below. In the first document 202, the landmark entries selected are "Mary", "a", and "lamb", denoted by L0, L1, and L2 respectively. In the second document 204, the landmark entries selected are "The", "ate", and "lamb", also denoted by L0, L1, and L2 respectively.

Once the landmark entries are selected, a landmark directory 206 is constructed, as shown in FIG. 2B. The landmark directory 206 is configured to record each landmark's location within the indexed documents 202, 204. The landmark directory 206 includes a document listing 208 and a plurality of landmark position listings 210.

The document listing 208 contains entries uniquely identifying each indexed document 202, 204. For example, the document listing 208 may store the network file locations of the indexed documents 202, 204. Alternatively, each document may be assigned a numerical value and a lookup table (not shown) can be used to find the document. Each entry in the document listing 208 is associated with a landmark position listing 210.

The landmark position listing 210 is configured to identify the location of each landmark in a document. In one embodiment, the locations of landmarks are calculated with respect to the beginning of the document. For example, in the first document 202, the initial landmark L0 ("Mary") is the first word of the document and is therefore recorded as position 0. The second landmark L1 ("a") of the document 202 is the third word and is recorded as being in position 2, and so on. Other embodiments of the invention may calculate the position of landmarks using various alternative techniques known to those skilled in the art.

Once the landmark directory 206 is constructed, a repository index 212 is created. The repository index 212 is configured to store the location of the document entries (i.e., words) relative to landmarks. In one embodiment of the invention, for each repository index entry, the repository index 212 includes an entry identifier 214, a document identifier 216, and a location identifier 218.

The entry identifier 214 is configured to store the various document entries in the documents 202, 204. The entry identifier 214 may not necessarily uniquely identify each document entry. For example, the entry identifier 214 may ignore upper case letters, such that the words "The" and "the" are mapped to the same entry. It is contemplated that other entry filtering/mapping may be performed on document entries before they are recorded in the entry identifier 214.

The entry identifier 214 is coupled to the document identifier 216. The document identifier 216 lists the document or documents containing the document entry referred to by the entry identifier 214. For example, the word "lamb" is used in both the first document 202 and the second document 204. Therefore, the document identifier 216 for this entry contains both documents 202, 204.

The location identifier 218 uses a landmark identifier 220 and a position offset 222 to form a landmark-offset pair. The landmark identifier 220 contains an identification of a landmark entry within the document. The position offset 222 contains the distance between the document entry and the landmark entry referred to by the landmark identifier 220. Thus, the landmark-offset pairs, along with the landmark directory 206, can be used to locate the exact position of document entries within documents. For example, using the repository index 212, document entry "little" is present in doc #12 (the first document 202) and is offset by one entry from landmark L1. Referring to the landmark directory 206, landmark L1 in doc #12 is located at position 2 from the beginning of the document. Therefore, document entry "little" is located at position 3 from the beginning of doc# 12.

Because the location identifier 218 describes the location of document entries relative to landmark entries, each landmark entry acts as a reference point within a document. In other words, the landmark entries in a document can be thought of as document partitions dividing the document into blocks. The beginning of each block corresponds to a landmark entry and the location of every document entry in a block is encoded as an offset from the beginning of that block. Each landmark entry corresponds to a block and vice-versa.

In many circumstances, using landmark-offset pairs to encode the positions of document entries beneficially reduces the number of update operations required when indexing documents that have changed. As described in detail below, landmark entries help localize changes to the repository index 212 by only requiring those document entries within the modified block to be updated, along with the relatively small landmark directory 206. Thus, utilizing the data structure of the present invention makes document indexing more "shift-invariant" in many cases.

Figure 3:
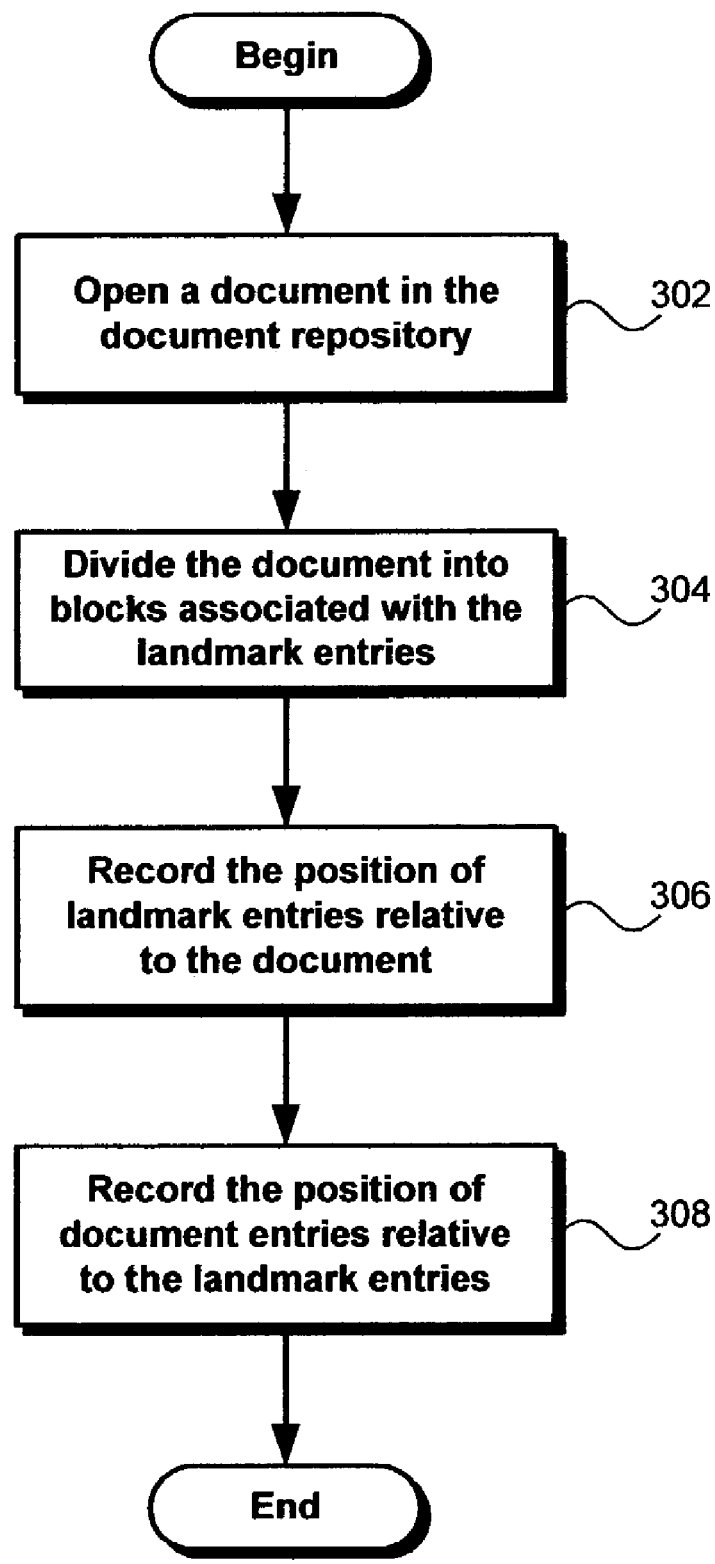
FIG. 3 shows a flowchart for indexing a document in accordance with one embodiment of the invention.

Turning now to FIG. 3, a flowchart for indexing a document in accordance with one embodiment of the invention is shown. It should be remarked that the logical operations shown may be implemented (1) as a sequence of computer executed steps running on a computing system and/or (2) as interconnected machine modules within the computing system. The implementation is a matter of choice dependent on the performance requirements of the system implementing the invention. Accordingly, the logical operations making up the embodiments of the present invention described herein are referred to alternatively as operations, steps, or modules.

Operation flow begins with opening operation 302. During this operation, the system accesses a document in the document repository. Selection of which document to open can be made using various automated techniques known in the art, such as network crawlers. Document selection may also be accomplished manually using, for example, a document submission form. As mentioned above, documents opened by the present may contain text, audio clips, images, video clips, program code or any combination thereof. After the opening operation 302 is completed, control passes to dividing operation 304.

At dividing operation 304, the opened document is divided into a plurality of blocks, and each block is associated with a landmark entry. In one embodiment of the invention, a document block begins at its associated landmark entry and ends just prior to the next landmark entry.

Landmark entries are selected using a landmarking policy. Some examples of landmarking policies are fixed size partitioning, HTML/XML tags, metadata, and semantic structure of document. In a fixed size partitioning policy, the size of every block is fixed when the documents are first indexed. HTML tags such as the paragraph tag (<p>) can also be used as landmarks. In contrast to the fixed size policy, the landmarks in this case are inherent in the document. It is contemplated that other landmarking policies may be used without departing from the scope of present invention. Once the dividing operation 304 is completed, control continues to recording operation 306.

At recording operation 306, the position of each landmark entry relative to the document is recorded in the landmark directory. This operation may include storing a document identification entry in a document listing and a plurality of entries in a landmark position listing. It is contemplated that various data structure configurations may be used to store landmark information, including data arrays, trees, and linked lists. After recording operation 306 is completed, control passes to recording operation 308.

At recording operation 308, the position of at least one document entry relative to the landmark entry of the block containing the document entry is recorded. This operation involves reading a document entry and keeping track of which document block it belongs to. The position of the document entry relative to the landmark associated with the block is then recorded in a repository index. For example, if the associated landmark entry is at the beginning of each document block, the position of document entries are recorded relative to the beginning of the block containing the document entry.

In one embodiment of the invention, an inverted index of the document entries is created. In this embodiment, each document entry is recorded as a tuple containing an entry identifier, a document identifier, and a location identifier <word_id,doc id,loc_id>, with each location identifier containing a landmark identifier and a position offset pair <ldmk_id,offset>. It is contemplated that other document indexing structures may be used with the invention. Recording operation 308 may further include filtering, reformatting, or ignoring various document entries before their positions are recorded. After recording operation 308 is finished, the indexing process for the document is completed.

Once a document is indexed, the present invention beneficially provides an efficient system to update the index for documents whose contents have changed. The invention uses the idea of landmarks together with an edit transcript to significantly reduce the number of entries in the index that need to be updated. Landmarks maintain positional information for each document entry while simultaneously allowing fast dynamic updating of the indexes.

Figure 4:
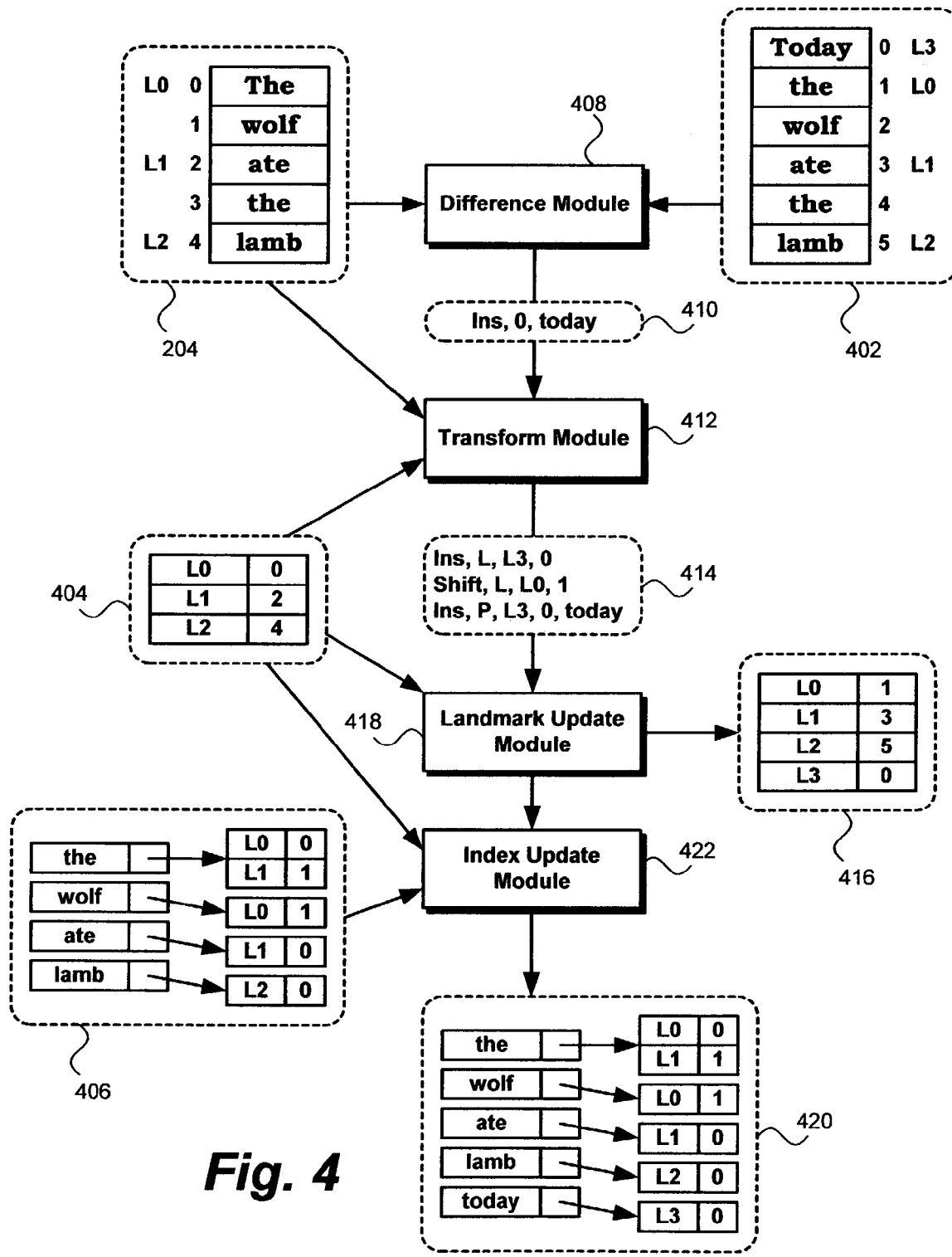
FIG. 4 shows an exemplary system for updating the landmark directory and repository index of present invention.

To illustrate the index updating process of the present invention, an old document version 204 and a new document version 402 are shown in FIG. 4. The old document version 204 has been indexed, and includes an old landmark directory 404 and old repository index 406. As shown, the old document version 204 contains the sentence "The wolf ate the lamb", and the new document version 402 contains the sentence "Today the wolf ate the lamb".

In order to update the repository index such that the contents of the new document version 402 are recorded, the old document version 204 and the new document version 402 are first compared using a difference module 408. The difference module 408 is configured to generate an edit transcript 410 that describes the difference between the old document version 204 and the new document version 402. In the example shown, the difference module 408 outputs, "Ins, 0, today". Thus, the edit transcript 410 indicates that the word "today" was inserted at position 0 in new document version 204.

In one embodiment of the invention, the diff program found in the UNIX(r) operating system is utilized to generate the edit transcript 410. UNIX is a registered trademark of UNIX Systems Laboratories, Inc. It is contemplated that other programs and solutions known in the art for generating the edit transcript 410 may be employed by the present invention.

The invention may include a transform module 412 that receives the edit transcript 410. The transform module 412 is configured to transform the edit transcript 410 into corresponding instructions for updating the landmark directory 404 and repository index 406. The instructions generated by the transform module 412 are stored in an update transcript 414. For example, the entries in the update transcript 414 instruct the system to insert a new landmark entry ("L3") with a position 0. The update transcript 414 also instructs the system to shift the landmarks starting at landmark entry L0 by adding 1 to their position, and insert a "today" posting to the repository index. It is noted that only the old document version 204, the old landmark directory 404, and the new document version 402 are needed to create the update transcript 414. Thus, the procedures for generating the update transcript 414 lend themselves to parallel processing.

It is contemplated that the update transcript 414 can contain various commands to update the landmark directory. Such commands may include Insert, Delete, DeleteRange, Shift, Find_Pos, Find_Ldmk, and Find_All_Ldmk. A brief summary of these commands is provided in Table 1. Depending on the landmarking policy chosen, not all of these commands will be required.

TABLE 1

Landmark directory update commands

| Command | Description |
| --- | --- |
| Insert(pos) | Inserts a new landmark at position pos (possibly because of an insertion of a piece of text in the document). |
| Delete(landmark_id) | Deletes the landmark landmark_id (possibly because of a deletion of a piece of text in the document). |
| DeleteRange (landmark_id$_1$, landmark_id$_2$) | Deletes all landmarks occurring between landmark_id$_1$ and landmark_id$_2$. This is used when a piece of text spanning several landmarks is deleted. |
| Shift(landmark_id, value) | Adds value to the position of all the landmarks that occur after landmark_id. |
| Find_Pos(landmark_id) | Returns the position of the landmark landmark_id. This is used during query processing, when we want to know the actual position corresponding to the tuple <word_id, doc_id, loc_id> that we obtain from the inverted file. |
| Find_Ldmk(pos) | Returns the landmark corresponding to the position pos. This is used when we generate the edit operations for the inverted file given the edit transcript of the document. |
| Find_All_Ldmk(pos_range) | Returns all the landmarks corresponding to the positions in the range pos_range. This operation is not required if HTML tags are used as landmarking policy and brute force diff is not used to obtain the edit transcript. |

Before applying the list of update commands generated by the difference module 408 and transform module 412, commands in the update transcript 414 can be batched in various ways for optimization. The batched entries can be further optimized by removing redundant entries that have been superseded by merging operations that undo one another, such as deleting and inserting the same word in the same position, and by grouping together operations on the same document entry in order to improve locality.

After the update transcript 414 is generated, an updated landmark directory 416 is generated at a landmark update module 418, and an updated repository index 420 is generated at an index update module 422. The landmark update module 418 is configured to update the landmark directory 416 such that the positions of landmark entries with respect to the new document version 402 are maintained. Similarly, the index update module 422 is configured to update the repository index 420 such that the positions of document entries in the new document version 402 with respect to the landmark entries are maintained.

In the example shown, landmark directory 416 is revised by adding one to the position of landmark entries L0, L1, and L2. Furthermore, a new landmark entry (L3) is inserted into the landmark directory 416. The repository index 420 is updated by inserting document entry for "today". Note that none of the other document entries in the repository index 420 change because their positions are recorded relative the landmark entries rather than the document itself. Thus, as the example demonstrates, the overhead incurred in storing and maintaining landmark directory 416 is generally insignificant compared to the reduction in the number of repository index update operations and in the faster update time.

Figure 5:
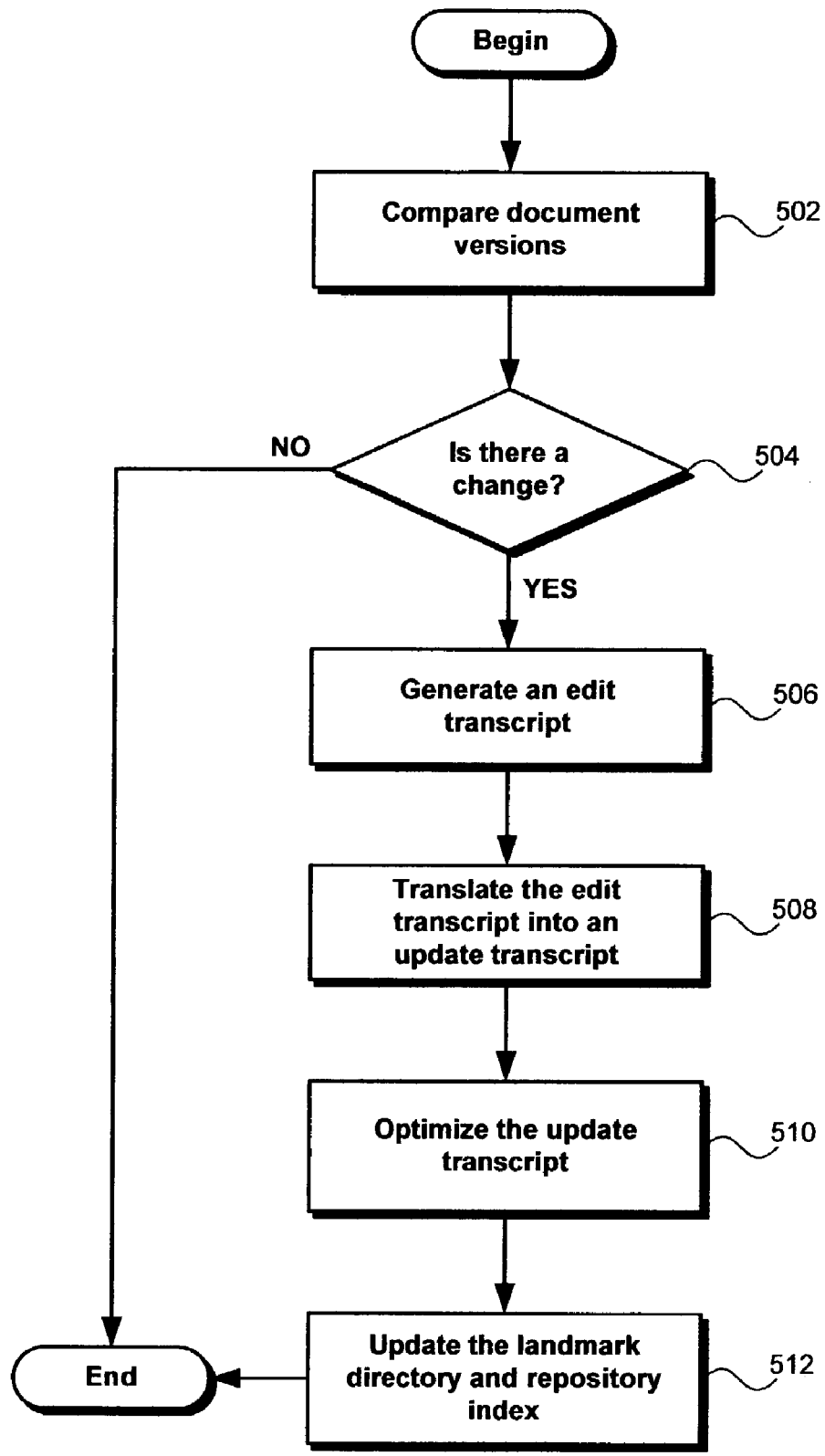
FIG. 5 shows an exemplary flowchart for updating the landmark directory and repository index.

In FIG. 5, an exemplary flowchart for updating the landmark directory and repository index is shown. The flowchart begins at comparing operation 502. During this operation, the old document version and the new document version are compared to one another. Generally, the new document version is received from the document repository, while the old document version is represented using the exiting landmark directory and repository index entries for that document. Once the old and new document versions are compared, control passes to query operation 504.

At query operation 504, it is determined whether there is change between the old document version and the new document version. If no change occurred between versions, there is no need to update the document index and the process is ended. If, however, there is a difference between the old and new document versions, control passes to generating operation 506.

At generating operation 506, an edit transcript is produced. The edit transcript identifies what changes were made to the old document version. For example, the edit transcript identifies which document entries were deleted, added, or modified since the old document version. Once the generating operation 506 is completed, control passes to translating operation 508.

At translating operation 508, the edit transcript is translated to an update transcript. During this operation, the landmark directory for the document is checked against the edit transcript to determine the exact modification needed to the document indexing structure. These modifications are stored in the update transcript. After the translating operation 508 is completed, control passes to optimizing operation 510.

At optimizing operation 510, the update transcript is inspected to eliminate any updating inefficiencies that may exist. As mentioned above, the optimizing operation 510 may, for example, delete updating operations that cancel each other out (such as deleting and inserting the same word), or group operations together to improve updating speed. Once the optimizing operation 510 is completed, control passes to updating operation 512.

At updating operation 512, the process updates the landmark directory and repository index according to the optimized and update transcript. This operation may include adding, deleting or modifying entries in the landmark directory and repository index. As discussed above, the present invention can substantially reduce the number of update operations preformed as compared with conventional indexing techniques when small, localized changes are made to the document. This is due to fact that the positions of document entries are recorded relative to landmark entries rather than the document itself. By doing so, the document index becomes more shift-invariant, requiring fewer update operations when entries are added or inserted in localized areas of the document. Once the updating operation 512 is completed, the process is ended.

The foregoing description of the invention has been presented for purposes of illustration and description. It is not intended to be exhaustive or to limit the invention to the precise form disclosed, and other modifications and variations may be possible in light of the above teachings. For example, the transform module 412 and the landmark update module 418 in FIG. 4 may be combined into a single module that both creates an update transcript 414 and updates the landmark directory 416. Thus, the embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A method for updating a repository index such that contents of a new document version are recorded, the method embodied in computer readable medium, the method comprising:
dividing a previous document version into a plurality of blocks, wherein each block is associated with a landmark entry;
storing the location of landmark entries in the previous document version in a landmark directory;
recording the position of at least one document entry relative to the landmark entry of the block containing the document entry in a repository index;
comparing the new document version with the previous document version;
generating an edit transcript describing the difference between the previous document version and the new document version;
transforming the edit transcript into corresponding instructions for updating the landmark directory and repository index;
updating the landmark directory such that the positions of landmark entries with respect to the new document version are maintained;
updating the repository index such that the positions of document entries in the new document version with respect to the landmark entries are maintained; and
batching commands in an update transcript before updating the landmark directory and repository index.

2. The method of claim 1, further comprising recording the position of each landmark entry relative to the previous document version.

3. The method of claim 1, further comprising selecting the landmark entries according to a landmarking policy.

4. The method of claim 1, further comprising:
wherein the beginning of each block corresponds to the associated landmark entry; and
wherein recording the position of the at least one document entry includes recording the position of the document entry in the block as an offset from the beginning of the block.

5. The method of claim 1, wherein recording the position of the document entry includes recording a landmark identifier and a position offset for the document entry.

6. The method of claim 1, wherein recording the position of the document entry includes recording an entry identifier, the entry identifier configured to include an indicia of the document entry and to be associated to the position of the document entry.

7. The method of claim 6, wherein recording the entry identifier includes filtering the document entry.

8. The method of claim 1, configured as a computer program product embodied in a computer readable medium.

9. The method of claim 1, wherein the landmark directory includes, for each document, a landmark position listing configured to store the position of each landmark in the document.

10. The method of claim 1, wherein for each document entry, the repository index includes at least one location entry configured to store a landmark identifier and a position offset.

11. The method of claim 1, further comprising transforming the edit instructions in an update transcript, the update transcript including instructions for updating the landmark directory and repository index.

12. The method of claim 3, wherein the landmark policy includes a fixed size partitioning of the document.

* * * * *